March 2, 1937. A. R. BLAKEY 2,072,093
PROCESS AND APPARATUS FOR THE FRACTIONAL DISTILLATION OF LIQUIDS
Filed June 1, 1929
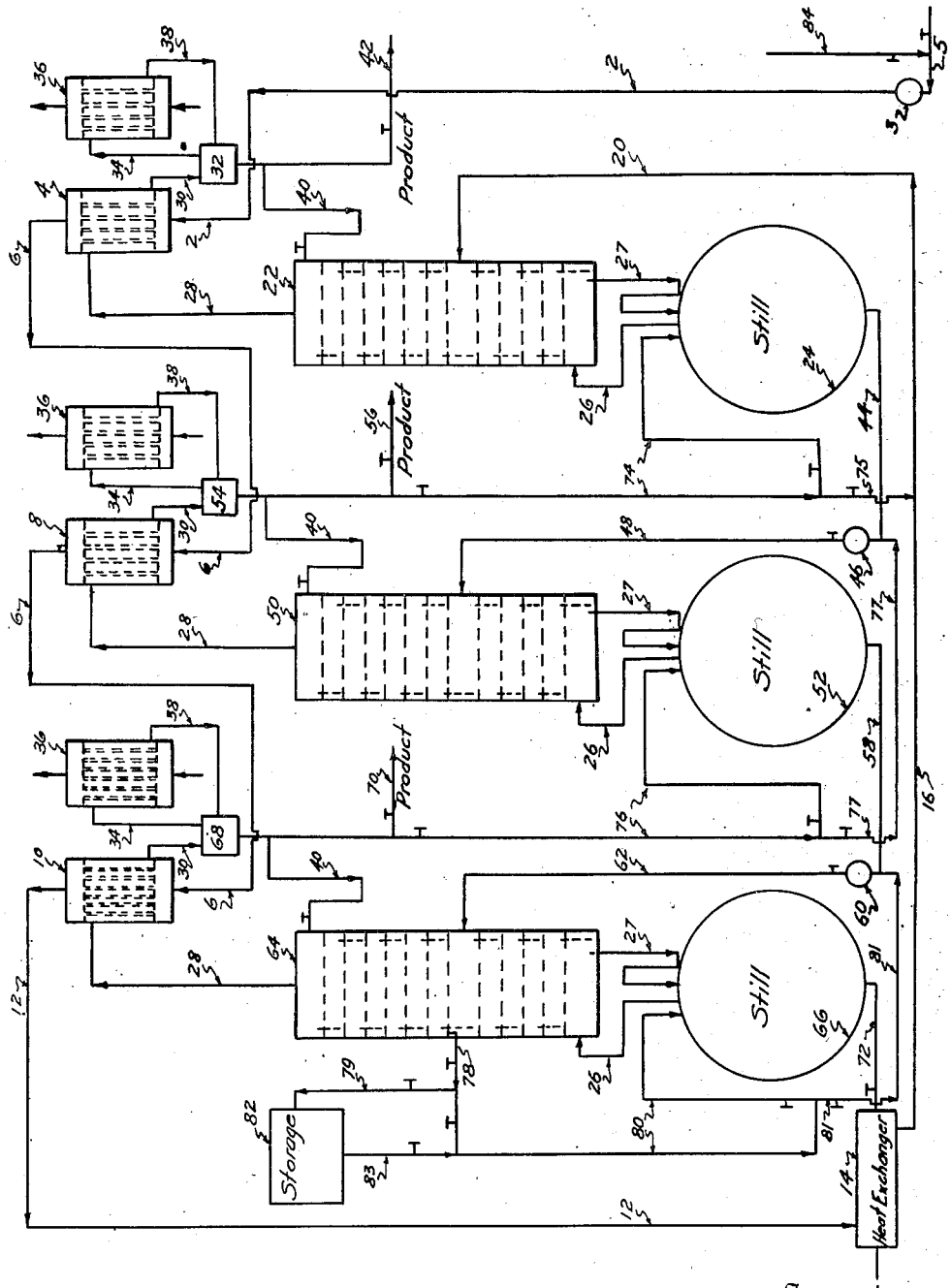
Inventor
Angus R. Blakey Patented Mar. 2, 1937

2,072,093

UNITED STATES PATENT OFFICE 2,072,093

PROCESS AND APPARATUS FOR THE FRACTIONAL DISTILLATION OF LIQUIDS

Angus R. Blakey, Orange, N. J., assignor to Doherty Research Company, New York, N. Y., a corporation of Delaware Application June 1, 1929, Serial No. 367,739

26 Claims. (Cl. 196—73)

The present invention relates to the art of distillation and more particularly to the separation of liquid mixtures into fractions. The invention is of particular importance in cases in which it is desired to protect the products against chemical change due to the application of temperatures necessary for distillation.

In present fractional distillation systems in which liquid mixtures, the constituents of which have different boiling temperatures, are distilled in a still and rectifying tower, it is necessary to distill into the tower constituents having relatively high boiling points in order to distill from the parent liquid and reflux of the still and tower the lowest boiling constituent or constituents.

In such a system it is well known that the higher boiling constituents in the tower on condensing to form reflux give up their latent heat of vaporization, and some of their sensible heat to the refluxing constituents. This transfer of heat to the colder reflux distills off the lighter constituent or constituents from the reflux causing such constituents to advance up the tower as a vapor.

This type of operation is common in distilling crude petroleum or vegetable oils or their distillates, or in distilling mixtures of alcohols and crude rosins, but it has been found that in order to vaporize a given quantity of a low boiling constituent from a given liquid, and deliver the same as a vapor at the top of the tower, the quantity of high boiling product which it will be necessary to vaporize and distill into the tower decreases with an increase in the percent of the cut present adjacent in boiling range to the one taken off as the overhead distillate. This increase in the quantity of the fraction adjacent to the overhead product serves to decrease the still temperature and increase the yield of the overhead product.

Furthermore a definite quantity of heat is necessary in the tower in order to vaporize and drive over the desired overhead product. When the quantity of the material having a boiling range adjacent to the overhead product is insufficient for the purpose of driving the desired overhead product into and through the tower, then still higher boiling material must be vaporized and passed into the tower to supply the necessary heat. This higher boiling material has a lower latent heat of vaporization than the lower boiling point constituents and therefore a greater weight would have to be vaporized to supply a given amount of heat. The use of the high boiling material for this purpose necessarily increases its concentration in the reflux in the tower and therefore increases its concentration in the vapor in equilibrium with the tower reflux. Under such conditions the yield of the desired overhead product obtainable from a given liquid mixture is actually smaller than might otherwise be obtained, because of the necessity of preventing any appreciable amount or proportion of the high boiling material from passing over from the tower with the vapors of the desired product. The vaporization of the higher boiling material also requires a higher still temperature than would otherwise be necessary.

An important object of the present invention is therefore, to provide a process for distilling liquid mixtures in which the high boiling vapor used in the tower for driving over the desired product or fraction in vapor form, is the next higher boiling constituent or fraction in the mixture being distilled, or an added constituent or fraction corresponding thereto.

A further object of the invention is the provision of a process for fractionating liquid mixtures in which a materially reduced still temperature is used over that at present employed for the recovery of substantially the same fraction.

A further object of the invention is the provision of an apparatus adapted to carry out the process.

Other and further objects of the invention will be apparent from the following description taken in connection with the accompanying drawing in which:

The figure is a diagrammatic elevational view of an apparatus adapted to carry out the process of the present invention.

Referring to the drawing, the liquid mixture to be fractionated which may for the purpose of this description be crude petroleum or one of its distillates, is introduced into the system through a feed pipe 2 by means of a pump 3 which may draw oil from any suitable source of supply through a valved pipe 5. The oil or other mixture introduced through the pipe 2 is passed through a heat exchange condenser 4 wherein the oil passes in indirect heat exchange with vapor. From the condenser 4 the oil is conducted by pipes 6 through similar condensers 8 and 10, then by a pipe 12 to a heat exchanger 14, from which the preheated oil passes by pipes 16 and 20 into the mid-portion of a rectifying tower 22, comprising one of the fractionating towers of the distilling apparatus.

In the tower 22 the heavier constituents of the oil pass downwardly over the trays countercurrent to vapors from a still 24, which enter the column through a vapor line 26. The oil and heavy condensate pass from the tower 22 through a reflux line 27 into the still 24. The light constituents of the oil, which in the case of crude petroleum would be gasoline constituents, pass upwardly through the tower 22, through vapor conduit 28, and into the condenser 4, where they are partly condensed by heat transfer with the cold crude oil previously referred to. The condensate and vapors from the condenser 4 pass through a pipe 30 into a receiver 32 from which the vapors are conducted through a vent pipe 34 to a water cooled condenser 36, the condensate from which may be conducted through a pipe 38 into the receiver 32.

The cut temperature on the tower 22 is preferably maintained at the proper point for taking over end point gasoline. This temperature control is simplified by returning to the tower a portion of the distillate from the receiver 32, by a valved pipe 40. The returned distillate will be revaporized and in turn condense constituents which are too heavy. The distillate recovered in receiver 32 may be passed through a cooler and to storage through a valved pipe 42.

In order to separately recover the other commercial fractions from crude petroleum the unvaporized oil in still 24 is passed on through a series of units similar to that described in connection with still 24 and tower 22. Therefore unvaporized oil is withdrawn from still 24 by a pipe 44 and a pump 46, and passed by a pipe 48 into the mid-portion of a tower 50 which is supplied with vapors from a still 52. The operation of this still and tower is similar to that previously described, the distillate product being collected in a receiver 54 and may be conducted to storage by a valved pipe 56. This product may be a furnace oil or kerosene as desired.

The oil remaining unvaporized in still 52 is conducted by a pipe 58, a pump 60 and a pipe 62 into the mid-portion of a tower 64. This tower discharges at its base into a still 66 which in turn supplies vapors for the tower. The distillate taken overhead from tower 64 is collected in a receiver 68 and may be conducted to storage by a valved pipe 70, while the bottoms from the still 66 are passed by a valved discharge pipe 72 into heat exchanger 14, and finally to storage or to further treating apparatus.

In order to secure a high yield of product from the tower 22 and at the same time maintain the temperature in still 24 as low as possible a portion of the distillate from receiver 54 is returned to still 24 by means of a valved pipe 74. This returned product may be referred to as the product next higher boiling than the desired product taken overhead from the tower 22 and collected in receiver 32. The presence of this adjacent higher boiling distillate in the still 24 insures a sufficient quantity of vapors of a boiling range adjacent to the desired overhead product from tower 22, to furnish the necessary heat for the fractionation and rectification of the down flowing reflux in the tower. This procedure avoids the necessity of using the high still temperatures employed in present methods of distillation.

The further advantage, of a higher yield of the low boiling more valuable product (gasoline) is obtained. This is due to the absence of, or to the low concentration of the relatively high boiling ends in the tower 22, where the heat is supplied and the distillation effected by vapor constituents having a boiling range very close to that of the desired overhead product.

If the apparatus were operated without return of distillate to the still 24, it would be necessary to drive some of the very high boiling constituents of the oil into the tower 22 in order to supply sufficient heat to drive over the gasoline constituents. Furthermore in order to deliver the same number of heat units, larger quantities of gas oil, for example, would have to be vaporized than of kerosene, because as the boiling points and molecular weights of the constituents increase their latent heats of vaporization decrease, i. e., in condensing a given quantity of gas oil on the trays of tower 22, less heat is transferred to vaporize gasoline than would be transferred by the same quantity of kerosene or lighter distillate. The use therefore, in the still 24 of a suitable quantity of a distillate of higher boiling point and closely related to the desired distillate product, gives an increased yield, a lower still temperature, and therefore less cracking, and a higher heat transfer efficiency in the rectifying operation.

The results secured by the return of distillate to still 24 is also secured in connection with still 52 by the passing of distillate from receiver 68, through a valved pipe 76, into this still. Likewise and for the same purpose, distillate may be withdrawn from the tray in tower 64, above the one on which pipe 62 discharges, by a valved pipe 78, and passed through a connecting valved pipe 80 into the still 66. Any excess of the distillate withdrawn through pipe 78 and not sent to still 66 may be conducted through a valved pipe 79 to a storage tank 82.

In starting up the apparatus the distillate supplied to still 66 is preferably drawn from storage tank 82 through a valved outlet pipe 83 which connects with pipe 80. This will only be necessary until sufficient fresh relatively hot distillate is available in the tower. Likewise suitable distillate from storage may be supplied to the stills 24 and 52 for starting the apparatus and bringing it up to normal operating conditions. Instead of introducing the returned distillate directly to the preceding still it may be returned to the corresponding tower with the feed stock. This may be accomplished by means of suitable valved connecting pipes 75, 77 and 81 which connect respectively the pipes 74 and 16, 76 and 44, and 80 and 58. The apparatus is preferably operated however, with direct passage of distillate to the preceding still.

The showing of the apparatus in the drawings includes only three units, but it is to be understood that the invention is not to be thus limited, since a larger number may be necessary to secure in one run a complete commercial fractionation of the oil to be treated. Likewise the "adjacent" distillate introduced into any of the stills may be taken from any source without departing from the spirit of the invention. In fact an outside distillate would be necessary where the particular oil being treated was deficient in or contained only a relatively small proportion of the necessary distillate for use in the preceding still.

As a specific illustration of the features of the invention and the application of the principle thereof, note is made of the following example:

A sample of Seminole crude petroleum was analytically distilled and cut into the usual fractions, the yields and still temperatures noted for the various products in accordance with the usual practice. A sample of the same oil was fractionated in accordance with the process of the invention, in which fractionation a kerosene (having an initial of 444° F. and an end of 550° F.) was added during the recovery and distillation of the gasoline (437° F. end). For the gasoline fraction alone the increase in yield was 4½%, while the still temperature was 150° F. lower than necessary to drive over the same end point gasoline in the previous usual procedure.

While the invention has been described in connection with the treatment of crude oil it is likewise applicable to the distillation of other liquid mixtures such as mixtures of alcohols or esters, or to the production of lubricants by distilling topped crudes or other oil fractions. The use of low temperatures is of particular importance in producing lubricating oils in order to avoid cracking. In this respect the process has the distinct advantages of the low temperatures employed in vacuum distillation and at the same time the added advantage of the thorough rectification of the vapors.

The invention may also be used in the distillation of crude rosin mixtures in which it is important that decomposition be avoided and at the same time to secure a good fractionation of the material.

Where refinery operations include both cracking and crude running the feed stock for the present apparatus may include besides crude oil the pressure distillate from the cracking units for re-running. In this case the pressure distillate is fed in through a valved pipe 84 and mixed with the crude in the desired proportion in the pipe 5. The distillate removed through the pipe 42 will comprise a blend of straight run and cracked gasoline, the composition of which may be controlled by adjusting the relative amounts of the feed.

Having thus described the invention in its preferred form what is claimed as new is:

1. The process of obtaining a fraction from crude petroleum by distillation, which comprises introducing the crude petroleum into the mid-portion of a vapor rectifying zone in the lower portion of which the oil flows counter-current to vapors and is passed into a still from which said vapors issue, heating the oil in the still sufficient to vaporize the lowest boiling fraction of said oil and the constituents of said oil having boiling points immediately higher than said fraction, conducting such vapors into said rectifying zone and taking off the said lowest boiling fractions from said zone as vapors, passing oil from said still into a second rectifying zone and still from which a vapor fraction is removed and condensed having constituents of higher boiling point but immediately adjacent to that of said lowest fraction, and introducing portions of said constituents into said first mentioned still to augment the supply of such constituents to be vaporized into said first mentioned rectifying zone.

2. The process of distilling crude petroleum oil to produce therefrom a series of fractions, which comprises passing the oil to be distilled through a series of distilling zones in each of which the oil is heated to a temperature sufficient to effect vaporization and the vapors subjected to rectifying conditions, introducing into each zone in addition to the crude oil constituents and any reflux condensate passing thereinto an oil having an average boiling point higher than but closely adjacent to that of the fraction, to be recovered from each zone thereby to effect the distillation in each zone at a relatively low temperature, passing vapors from the rectifying portion of each zone into a condensing zone wherein a condensate is produced, and returning to the rectifying portion of each zone a part of said condensate.

3. The process of distilling crude petroleum in a still and tower, which comprises introducing the crude oil into the mid-portion of the tower and passing the same downwardly through the tower countercurrent to the passage of vapors from said still, rectifying the vapors in the tower, maintaining a sufficiently high temperature in the still to give a cut temperature on the tower suitable for removing therefrom gasoline vapors, and introducing into the still a light kerosene distillate in addition to the quantity of such constituents passed thereinto in said crude oil and produced in said tower, thereby to maintain a comparatively low temperature in said distillation and increase the yield of gasoline.

4. In the process of distilling liquid mixtures containing fractions boiling at different temperatures, in which such a mixture is subjected to distilling conditions adapted to remove as a vapor the lowest boiling fraction thereof, the improvement which comprises maintaining in the distilling zone a sufficiently high temperature and a sufficient quantity of the fraction immediately higher boiling than the said vapor fraction and of lower boiling point than said mixture by introducing into said distilling zone sufficient quantities of said higher boiling fraction in addition to that produced in said zone from said mixture to drive over as vapor said vapor fraction and prevent substantial vaporization of constituents higher boiling under the conditions than said higher boiling fraction, thereby to effect the distillation at a relatively low temperature and at the same time secure the maximum possible yield of said lowest boiling fraction.

5. An apparatus for the distillation and rectification of liquid mixtures, comprising a series of stills each of which are provided with a rectifying tower and final condenser, means for passing liquid to be distilled into the mid-portion of the tower of the first still and the residue from each still into the mid-portion of the next succeeding tower, means for conducting liquid mixture and reflux condensate from each tower into the still therefor, means for conducting vapor from each tower into the final condenser therefor, means for introducing a portion of the condensate from each condenser into the next preceding still except the last, and means for introducing into the last still of the series a liquid fraction having a boiling point above that of the condensate recovered from the condenser of said still.

6. The method of conducting the distillation of crude oil at comparatively low temperatures, which comprises introducing crude oil and a distillate into a distilling zone, said distillate being produced separate from the oil treated in said distilling zone and comprising constituents having boiling points lower than the mean boiling point of said crude oil and closely adjacent to but higher than that of the desired distillate to be recovered from said oil, heating the oil constituents in the distilling zone to a temperature sufficiently high to vaporize and effect the rectification of the desired oil constituents, passing the vapors from said distilling zone into a rectifying zone, and removing from said rectifying zone the desired vapor fraction.

7. The method of vaporizing and supplying heat for rectification of vapors in a still and fractionating tower, which comprises introducing into the still in addition to the liquid to be distilled and any reflux condensate returned thereto a fraction having a boiling point lower than the mean boiling point of the liquid to be distilled and closely adjacent to but higher than the fraction to be recovered as an overhead product in the distillation, heating said introduced fraction to a temperature sufficiently high to vaporize it into said tower to supply the necessary heat thereto, and refluxing the constituents condensed in said tower back into said still.

8. The method of removing by distillation the lower boiling fraction of a liquid mixture, which comprises heating the mixture in a vaporizing zone and passing vapors therefrom into a rectifying zone for the separation of said lower boiling fraction, introducing into the vaporizing zone in addition to said liquid mixture and in addition to any fraction produced in said rectifying zone a liquid fraction having a boiling point higher than said lower boiling fraction but closely adjacent thereto, said introduced fraction being heated to a temperature sufficient to vaporize said lower boiling fraction, and removing from said rectifying zone for condensation the rectified vapors of said lower boiling fraction.

9. The process of obtaining a plurality of distillates from a petroleum oil, which comprises separately rectifying a plurality of streams of petroleum vapors in a series of zones of gradually increasing temperature, removing from each zone the lower boiling point constituents of the vapors passing therethrough, passing portions of the lower boiling constituents removed from each zone into the next preceding zone of lower temperature, withdrawing higher boiling point constituents from each zone, heating the higher boiling point constituents withdrawn from each zone to a temperature sufficiently high to supply the necessary heat in said rectifying zones, passing portions thereof into the next succeeding zone of higher temperature and other portions into the zone from which they were removed, and recovering from each zone a portion of said removed lower boiling constituents as a product.

10. The process of distilling a lubricating oil fraction from a crude oil residuum, which comprises adding to the said residuum a quantity of an oil fraction having a higher average boiling point than that of the lubricating oil fraction to be distilled from the residuum, said added oil fraction also having a lower boiling point than the heavier constituents of said residuum and being present in addition to any similar constituents or fraction contained in said residuum, and heating the mixture to a temperature sufficient to vaporize the lubricating oil from the mixture, the quantity of the added oil fraction being sufficient when heated to supply the heat of vaporization of said lubricating oil fraction.

11. The method of separating a relatively heavy oil fraction from a residuum containing higher boiling constituents than said fraction, which comprises adding to the residuum a quantity of an oil fraction having a boiling point immediately higher than that of the heavy oil fraction to be separated from the residuum and a lower boiling point than that of the said higher boiling constituents contained in the residuum, heating the resulting mixture to a temperature sufficient to vaporize the desired oil fraction, the quantity of added oil being sufficient to supply the heat of vaporization of the desired oil fraction and thereby prevent vaporization of the heavier constituents of the residuum.

12. The method of separating a relatively heavy oil fraction from petroleum oil residuum containing heavier constituents than said fraction, which comprises adding to the said residuum a quantity of an oil fraction of immediately higher average boiling point than that of the desired heavy oil fraction to be separated from the residuum and of lower boiling point than that of the said heavy constituents contained in said residuum, heating the resulting mixture to a temperature sufficient to vaporize the desired oil fraction, the quantity of added oil being sufficient to supply the heat of vaporization of the desired oil fraction to be separated, withdrawing liquid oil including constituents of the added fraction from the distilling operation, and returning at least a portion of the withdrawn fraction to be mixed with fresh residuum to be heated.

13. In the process of obtaining a plurality of fractional condensates from petroleum oil, which comprises rectifying vapors of said oil in a series of zones of decreasing temperature, withdrawing a rectified fraction from each zone and passing at least a portion thereof into the next adjacent zone of lower temperature to aid in the rectification of the vapors therein, passing at least a portion of the liquid constituents in each zone into the next adjacent zone of higher temperature, maintaining the temperature in each zone at a point adapted to effect the desired rectification therein, and withdrawing a portion of the rectified constituents from each zone as a fractional condensate.

14. The method of removing by distillation the lower boiling point constituents of a petroleum oil, which comprises heating the petroleum oil in a heating zone and passing the resulting vapors into a rectifying zone for the fractionation of said vapors, introducing into the heating zone a petroleum oil fraction having a boiling point higher than said lower boiling point constituents but closely adjacent thereto, heating the petroleum oil and the introduced oil fraction in said heating zone to a temperature sufficient to vaporize substantial portions of said introduced oil fraction and for supplying the heat necessary for rectifying the vapors in said rectifying zone, and removing from said rectifying zone for condensation the rectified vapors of said lower boiling point constituents.

15. The process of distilling crude petroleum to produce therefrom a series of fractions of progressively increasing mean boiling point, which comprises passing the crude petroleum to be treated through a series of vaporizing zones of increasing temperature from each of which a vapor fraction is removed and condensed, and introducing into each zone in addition to the crude oil constituents passing thereinto an oil distillate produced from the vapors formed in a separate zone and having a mean boiling point higher than but closely adjacent to that of the vapor fraction removed from the zone into which the distillate is introduced, said distillate being heated to a temperature sufficiently high and being present in sufficient quantity to supply the necessary heat for vaporizing and driving over said vapor fraction from each zone to thereby secure removal of said vapor fractions at a comparatively low temperature and prevent cracking of said petroleum.

16. The process of distilling crude petroleum oil in which the oil is subjected to non-destructive distillation, which comprises passing the oil to be distilled through a series of distilling zones of increasing temperatures in each of which an oil fraction is vaporized, rectifying the vapors from the first zone to remove therefrom a distillate comprising gasoline, rectifying the vapors from and recovering an overhead distillate of higher mean boiling point than said gasoline from the second distilling zone of the series, and introducing into the first zone a portion of the overhead distillate produced from the second zone, said distillate being heated to a temperature sufficient to vaporize the gasoline constituents.

17. The process of obtaining a plurality of fractions from a petroleum oil mixture, which comprises passing separate streams of vapors from said petroleum oil into a series of separate rectifying zones of decreasing temperature and rectifying the separate vapor streams therein, withdrawing a lower boiling point overhead product from each zone and passing a portion thereof into the next adjacent zone of lower temperature, heating the higher boiling point constituents from each zone and passing them into the next adjacent zone of higher temperature, and withdrawing a portion of the rectified overhead constituents from each zone as a fractional product.

18. The process of separating the lower boiling point hydrocarbon constituents from a mixture of hydrocarbons containing said constituents and relatively higher boiling point hydrocarbons, which comprises introducing the mixture into a fractionating column and therein subjecting it to rectifying conditions, introducing into the column a hydrocarbon constituent substantially free of the said lower boiling point constituents to be removed from the mixture, said hydrocarbon constituent having a boiling point higher but closely adjacent to that of said constituents to be removed from the mixture, maintaining the temperature in said column such as to effect the vaporization of said lower boiling point constituents, and removing the said lower boiling point constituents from the column as vapors substantially free of the higher boiling point constituents of said mixture.

19. The process of separating the lower boiling point hydrocarbon constituents from a mixture of hydrocarbons containing said constituents and relatively higher boiling point hydrocarbons, which comprises heating the mixture and introducing it into a fractionating column and therein subjecting it to rectifying conditions, introducing into the column a hydrocarbon fraction having a boiling point higher but closely adjacent to that of said constituents to be separated from the mixture, maintaining the temperature in said column such as to effect the vaporization of said lower boiling point constituents and their removal overhead as vapors from the column, and removing the said lower boiling point constituents from the column as vapors substantially free of the higher boiling point constituents of said mixture.

20. The process of separating a relatively high and relatively low boiling point material from a mixture thereof which is lacking in liquid material boiling between the boiling points of said materials, which comprises heating the mixture and passing the same into a fractionating zone, withdrawing the unvaporized material from the fractionating zone and mixing therewith a substantial proportion of a substance having a boiling point between the boiling points of the said materials, heating the mixture above the boiling point of the added substance and passing the vapors therefrom into the fractionating zone, whereby vapors of the said added substance rise through the fractionating zone and strip the said lower boiling material from the said higher boiling material, and removing vapors of the lower boiling material overhead from the fractionating zone.

21. The method of separating a relatively high and a relatively low boiling material from a mixture thereof as defined by claim 20 in which a mixture of the unvaporized high boiling material and added substance is withdrawn from the distilling operation and subjected to a subsequent distillation in which said substance is separated from the higher boiling material.

22. The method of separating a relatively high and a relatively low boiling material from a mixture thereof as defined by claim 20 in which the two materials of the mixture and the added intermediate boiling substance comprises three fractions each having a boiling range.

23. In the process of distilling a liquid mixture containing a relatively low boiling point constituent and a relatively high boiling point constituent but which contains substantially no intermediate boiling point constituents in which the mixture is heated and subjected to fractionation in a fractionating column, the improvement which comprises passing an added constituent of intermediate boiling point in vapor form upwardly through said column in contact with the mixture being fractionated therein whereby the lower boiling constituent is vaporized and separated from the higher boiling constituent and the distillation of the mixture effected at a substantially lower temperature than would be required in the absence of said added intermediate boiling constituent.

24. The process of separating a relatively low boiling point fraction from a liquid mixture containing said fraction and relatively high boiling point constituents but lacking a substantial proportion of intermediate boiling point constituents, which comprises adding to the mixture a substantial proportion of a fraction of intermediate boiling point in addition to any similar constituents contained in said liquid mixture, heating the resulting mixture to a temperature sufficient to vaporize the relatively low boiling point fraction and a sufficient proportion of the said intermediate boiling point fraction to supply the heat for fractionating the resulting vapor mixture in a fractionating column, and fractionating the resulting vapors in a column to separate out said relatively low boiling point fraction.

25. In the process of distilling a liquid mixture containing a relatively low boiling point fraction and a relatively high boiling point fraction but which is deficient in intermediate boiling point constituents in which the constituents of the high boiling point fraction have a tendency in the absence of a substantial proportion of intermediate boiling constituents to vaporize along with the low boiling point fraction in the removal of the latter from the mixture by fractional distillation, the improvement which comprises suppressing the vaporization of the constituents of the relatively high boiling point fraction during the distillation of the mixture by adding to the mixture a substantial proportion of a liquid fraction of intermediate boiling point in addition to any similar constituents contained in said liquid mixture and which is at least sufficiently vaporized in the distillation to supply the heat necessary to distil and fractionate out the relatively low boiling point fraction, and subjecting the resulting vapor mixture to fractionation in a column to separate out the constituents of said relatively low boiling point fraction.

26. The process of separating the lower boiling point hydrocarbon constituents by distillation from a mixture of hydrocarbons containing said constituents and relatively higher boiling point hydrocarbons but which for efficient distillation and fractionation is deficient in intermediate boiling point constituents, which comprises distilling and rectifying the mixture in the presence of an added hydrocarbon fraction of lower boiling point than that of said higher boiling point hydrocarbons and of higher boiling point than and substantially free of said lower boiling point hydrocarbon constituents, effecting the rectification of the vapors produced in the distilling operation in a rectifying column in the presence of a sufficient proportion of said added fraction to avoid the necessity of driving any substantial proportion of said higher boiling point hydrocarbons into the rectifying column to supply the heat necessary to effect the rectification of the vapors and drive said lower boiling point hydrocarbon constituents overhead from the column, whereby said distilling operation is effected at a lower temperature than would otherwise be possible under similar conditions but in the absence of said added fraction.

ANGUS R. BLAKEY.